United States Patent [19]
Tieckelmann et al.

[11] Patent Number: 5,849,985
[45] Date of Patent: Dec. 15, 1998

[54] USE OF PERSULFATE TO DESTROY HALOFORM

[75] Inventors: Robert H. Tieckelmann, Trenton; Dean S. Thorp, deceased, late of Jamesburg; by Colleen Gagliardi, executor, Dover; Gale D. Downey, Pennington, all of N.J.

[73] Assignee: FMC Corporation, Philadelphia, Pa.

[21] Appl. No.: 783,494

[22] Filed: Jan. 14, 1997

Related U.S. Application Data

[60] Provisional application No. 60/011,779 Jan. 14, 1996.
[51] Int. Cl.$^6$ .................. A62D 3/00; C02F 1/72
[52] U.S. Cl. ............ 588/206; 588/212; 210/759; 210/908
[58] Field of Search .................. 588/205, 212, 588/206; 210/759, 762, 908

[56] References Cited

U.S. PATENT DOCUMENTS

| | | | |
|---|---|---|---|
| 5,306,432 | 4/1994 | Puetz | 210/759 |
| 5,501,801 | 3/1996 | Zhang et al. | 210/748 |

FOREIGN PATENT DOCUMENTS 262139  11/1988  Germany.

*Primary Examiner*—Gary P. Straub
*Attorney, Agent, or Firm*—Bruce M. Monroe; Anthony L. Cupoli; Patrick C. Baker

[57] ABSTRACT

An alkali metal peroxydisulfate or caroate can be used alone or in combination to destroy haloform present in an aqueous system. The destruction results in a reduction in the amount of haloform in the system. In another aspect, uv light and the peroxydisulfate and/or caroate can be used together to destroy the haloform present in the aqueous system.

13 Claims, 1 Drawing Sheet

USE OF PERSULFATE TO DESTROY HALOFORM

TECHNICAL FIELD

This invention relates to water treatment. More particularly, this invention relates to the destruction of chloroform or bromoform in an aqueous environment.

BACKGROUND

Chlorine is commonly used as a disinfectant in the treatment of both recreational and industrial waters, such as found in swimming pools, and pulp and paper mills, and it is also used as a bleaching agent. In all such applications, the chlorine reacts with any soluble or any insoluble organic matter that is present to produce chloroform, an undesirable byproduct, which has been associated with health risks. Because of those health risks, it is desirable to reduce the amount of chloroform in the water.

East German patent 262139 (11/23/88) "Process for Improving Bathing Waste Quality" authored by H. J. Jessen, teaches that peroxygens can be used to prevent chloroform formation in chlorinated swimming pool water.

However, there is no known effective stand alone oxidative method for destroying a haloform already present in such a system. The term haloform, as used herein, means the following: chloroform, bromoform, or a combination thereof. In the absence of an activator, such as ultraviolet light, hydrogen peroxide would not normally react with a haloform, and even with the activator the reaction would not be rapid enough to be commercially feasible. Hydrogen peroxide, moreover, would not be used in a chlorinated system because the hydrogen peroxide would preferentially react with and destroy hypochlorous acid, the active form of chlorine that acts as the disinfectant or bleaching agent. Such preferential destruction of the active chlorine compounds is not desired, neither in swimming pool waters nor in industrial waters, since that destruction increases costs and reduces the effectiveness of the chlorination process.

Normally, neither dipersulfates nor caroates react in the same manner as hydrogen peroxide does, perhaps because they do not release hydrogen peroxide under normal conditions. The invention presented herein provides a breakthrough, as an effective stand alone oxidative method for destroying chloroform and or bromoform in aqueous solutions.

DISCLOSURE OF THE INVENTION

According to the invention presented herein, however, it has been discovered that dosing an aqueous, chloroform and/or bromoform containing system with a persulfate will destroy the chloroform and or/bromoform present in that system. This reaction of a persulfate with chloroform or bromoform was previously unknown.

DETAILED DESCRIPTION

Figure 1:
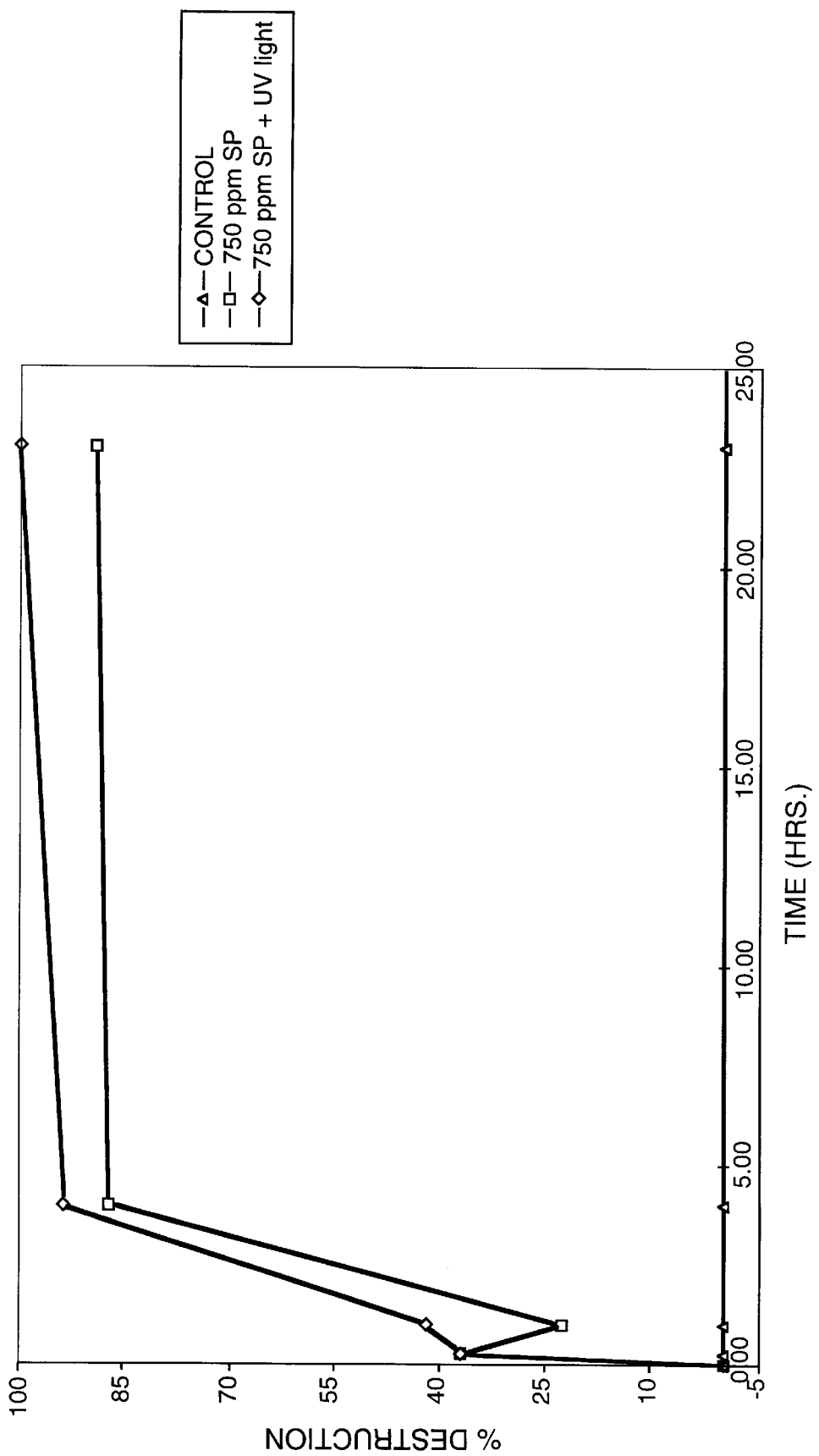
FIG. 1, a graphic view of the data presented Tables in 1A and 1B, depicts the destruction of chloroform with time.

The persulfates useful in this invention are the peroxydisulfate and caroate alkali metal salts, generally a sodium or potassium alkali metal salt. In order to destroy chloroform or bromoform, an effective amount of persulfate needs to be used. In an aqueous system, generally, a dosage of at least 5 ppm is effective. However, preferably 10 ppm or more is used, more preferably from 10–10,000 ppm, and most preferably from 500–2000 ppm. As a general rule, the greater the dosage of persulfate for any given concentration of haloform, the more rapid and more complete the haloform destruction will be.

The destruction of haloform by the persulfate is, according to this invention, a reduction in the amount of haloform present in the aqueous system. Percent destruction, in the water being treated, increases as the persulfate residence time or dosage increases, but decreases as contaminant levels increase. At a 24 hour residence time, a percent destruction of at least 15 percent or 35 percent is achievable, but generally reductions of 65% or more, 75% or more, 90% or more, and 100% are achievable.

Persulfate can be applied neat, as a formulated product, or as an aqueous solution. Caroate can be used; dipersulfate can be used; or both can be used together, in combination, as the persulfate of this invention. Caroate is commercially available under a DuPont trademark as Oxone®peroxymonosulfate.

In another aspect of the invention, chloroform or bromoform destruction can be enhanced if the UV light is used as a catalyst for the persulfate, particularly during the first hour immediately following persulfate dosing. However, continuous use of the UV is preferred. When UV augmentation is employed, generally the haloform decrease at the end of 24 hours will be greater than that which would have been achieved without UV. In the absence of significant other contaminants, reductions of generally 60% or more, preferably 80% or more, usually 90% or more, and ideally 100% are achievable. However, in the presence of some contaminants, only more modest decreases, of 15% or more, 30% or more, or 40% or more, are achievable. Contaminants include anything that competes with the reaction between the persulfates and the haloform. Contaminants include other UV absorbers, such as colorants and other organics; suspended matter, such as dirt or opacifiers, which may block the passage of the UV light into the water being treated; and compositions that enter into competing reaction with the persulfates.

It is believed that alkali metal persulfates destroy a haloform by oxidizing it. These persulfates when added to chlorinated or brominated systems, such as swimming pools, oxidize without destroying the active halogen disinfectant. The persulfates when added to industrial effluents oxidize the haloform, allowing environmental compliance. Thus, persulfates when added to aqueous systems destroy haloform, such as chloroform, without inhibiting halogen disinfection and or bleaching processes. Reducing or eliminating chloroform emissions permit environmental compliance, as well as improved air quality and safety.

The following examples are intended as a further illustration of the invention, but not as a limitation on the scope. All parts and percentages in the examples, and throughout this specification and claims, are by weight, and all temperatures are in degrees centigrade, unless otherwise indicated.

EXAMPLES 1–2

Persulfate Oxidation of Chloroform

In this example, sodium peroxydisulfate was applied at 750 ppm to an aqueous system having an initial chloroform concentration of 22 ppm. In order to prepare the sample used herein, a makeup solution of aqueous persulfate was prepared, as was a makeup solution of aqueous chloroform. Predetermined portions of each were taken and mixed to prepare a sample having the initial concentrations of persulfate and chloroform specified in each of Tables 1A and 1B below. Except where otherwise noted, deionized water was used throughout.

In those examples that designate the use of UV light, a Macbeth Spectra Light (a light source that simulates sunlight conditions) was used as the UV light source. For those tests, 250 mL samples were placed in a 500 mL quartz erlenmeyer flask that was then sealed and placed in a light box where the resulting solution was irradiated for the period of time specified in the tables.

For each of the testing points, a one mL portion was removed from the flask at the time specified, and that portion was then tested for chloroform concentration using gas chromatography. For the test, the gas chromatograph was fitted with a flame ionization detector and a test method obtained from the U.S. Environmental Protection Agency was employed: Organic Volatile Impurities Test Number 467. The results are reported in Tables 1A and 1B. FIG. 1 depicts the data in graph form.

Table 1A demonstrates that peroxydisulfate can effectively oxidize chloroform in aqueous solution. Table 1B demonstrates that the addition of ultra-violet light helped to catalyze dipersulfate destruction of chloroform. By 15 minutes after treatment, peroxydisulfate at 1000 ppm, either with or without UV light, had reduced chloroform concentrations by 37%. By 23 hours after treatment the chloroform was completely destroyed by the persulfate/UV light; without UV light, the chloroform levels were reduced by 90%.

EXAMPLES 3–14

Oxidation of Chloroform—Range Finding Study

In these examples, the procedures of Example 1 were used unless otherwise noted. Where UV light was used it was applied for the entire time period specified in Tables 2A–2D. As depicted in Tables 2A–2D, this study demonstrates that peroxydisulfate concentrations as low as 10 ppm can effectively oxidize chloroform. Caroate, also evaluated in the study, demonstrated chloroform destruction capability. Two chloroform concentrations (10 ppm and 2 ppm) were tested. The 2 ppm concentration was at the lower limit of the analytical capability. All test results are reported as obtained; any facial discrepancies are due to experimental error. Chloroform analysis was conducted as in Examples 1–2.

EXAMPLES 15–20

Chloroform Oxidation—Swimming Pool Water Samples

These examples demonstrate the efficacy of peroxydisulfate/UV light and caroate/UV light treatments towards destroying persulfate in actual swimming pool water samples. The samples exhibited normal pool water chemistry, containing organic matter, and chlorine, and having a pH of 7.2–7.8, an alkalinity of 80–120 ppm, and about 300 ppm calcium hardness.

The procedure of Examples 1–2 was employed. Chloroform was added to the swimming pool water, since the swimming pool water used did not initially contain chloroform. Chloroform concentrations were determined by the same precedure used in the previous studies. The results are reported in Tables IA through 3B. It is thought that persulfates may have reacted with other contaminants in the pool water, thus diminishing the chloroform destruction efficacy.

TABLE 1A

Treatment of 22 ppm CHCl3 with Na2S2O8 (No UV Light)

| Treatment | ppm Na2S2O8 | ppm $CHCl_3$ 0 Hour | % Reduction in CHCl3 | ppm $CHCl_3$ 1 Hour | % Reduction in CHCl3 | ppm $CHCl_3$ 4 Hours | % Reduction in CHCl3 | ppm $CHCl_3$ 23 Hours | % Reduction in CHCl3 |
|---|---|---|---|---|---|---|---|---|---|
| Control | 0 | 22.0 | 0.0 | 22.0 | 0.0 | 22.0 | 0.0 | 22.0 | 0 |
| Exp 1 | 750 | 13.8 | 37.3 | 17.0 | 22.7 | 2.7 | 87.7 | 2.2 | 90 |

TABLE 1B

Treatment of 22 ppm CHCl3 with Na2S2O8 and UV Light

| Treatment | ppm Na2S2O8 | ppm CHCl3 0 Hour | % Reduction in CHCl3 | ppm CHCl3 1 Hour | % Reduction in CHCl3 | ppm CHCl3 4 Hours | % Reduction in CHCl3 | ppm CHCl3 23 Hours | % Reduction in CHCl3 |
|---|---|---|---|---|---|---|---|---|---|
| Control | 0 | 22.0 | 0.0 | 22.0 | 0.0 | 22.0 | 0.0 | 22.0 | 0.0 |
| Exp 1 | 750 | 13.8 | 37.3 | 12.7 | 42.3 | 1.3 | 94.1 | 0.0 | 100.0 |

TABLE 2A

Treatment of 20 ppm CHCl3 with Na2S2O8 (No UV Light)

| Treatment | ppm Na2S2O8 | ppm $CHCl_3$ 0 Hour | % Reduction | ppm $CHCl_3$ 1 Hour | % Reduction | ppm $CHCl_3$ 6 Hours | % Reduction | ppm CHCl4 24 Hours | % Reduction |
|---|---|---|---|---|---|---|---|---|---|
| Control | 0 | 20.0 | 0.0 | 18.0 | 10.0 | 20.0 | 0.0 | 19.8 | 1.0 |
| Exp 3 | 10 | 18.7 | 6.5 | 16.6 | 17.0 | 12.7 | 36.5 | 9.7 | 51.5 |

TABLE 2A-continued

Treatment of 20 ppm CHCl3 with Na2S2O8 (No UV Light)

| Treatment | ppm Na2S2O8 | ppm $CHCl_3$ 0 Hour | % Reduction | ppm $CHCl_3$ 1 Hour | % Reduction | ppm $CHCl_3$ 6 Hours | % Reduction | ppm CHCl4 24 Hours | % Reduction |
|---|---|---|---|---|---|---|---|---|---|
| Exp 4 | 100  | 18.1 | 9.5  | 16.5 | 17.5 | 15.7 | 21.5 | 13.7 | 31.5 |
| Exp 5 | 1000 | 16.9 | 15.5 | 16.2 | 19.0 | 15.0 | 25.0 | 5.2  | 74.0 |

TABLE 2B

Treatment of 2 ppm CHCl3 with Na2S2O8 (No UV Light)

| Treatment | ppm Na2S2O8 | ppm $CHCl_3$ 0 Hour | % Reduction | ppm $CHCl_3$ 1 Hour | % Reduction | ppm $CHCl_3$ 6 Hours | % Reduction | ppm CHCl4 24 Hours | % Reduction |
|---|---|---|---|---|---|---|---|---|---|
| Control | 0    | 20.0 | 0.0  | 1.2 | 40.0 | 0.6 | 70.0 | 0.6 | 70.0  |
| Exp 6   | 10   | 1.9  | 5.0  | 1.1 | 45.0 | 0.2 | 90.0 | 0.7 | 65.0  |
| Exp 7   | 100  | 1.8  | 10.0 | 1.8 | 10.0 | 0.8 | 60.0 | 0.6 | 70.0  |
| Exp 8   | 1000 | 1.7  | 15.0 | 1.3 | 35.0 | 0.7 | 65.0 | 0.0 | 100.0 |

TABLE 2C

Treatment of 20 ppm CHCl3 with KHSO5 (No UV Light)

| Treatment | ppm KHSO5 | ppm $CHCl_3$ 0 Hour | % Reduction | ppm $CHCl_3$ 1 Hour | % Reduction | ppm $CHCl_3$ 6 Hours | % Reduction | ppm CHCl4 24 Hours | % Reduction |
|---|---|---|---|---|---|---|---|---|---|
| Control | 0    | 20.0 | 0.0  | 18.6 | 7.0 | 20.0 | 0.0   | 20.0 | 0.0  |
| Exp 9   | 10   | 20.5 | -2.5 | 19.2 | 4.0 | 23.3 | -16.5 | 15.4 | 23.0 |
| Exp 10  | 100  | 18.9 | 5.5  | 18.9 | 5.5 | 20.3 | -1.5  | 16.1 | 19.5 |
| Exp 11  | 1000 | 18.6 | 7.0  | 19.5 | 2.5 | 16.5 | 17.5  | 13.1 | 34.5 |

TABLE 2D

Treatment of 2 ppm CHCl3 with KHSO5 (No UV Light)

| Treatment | ppm KHSO5 | ppm $CHCl_3$ 0 Hour | % Reduction | ppm $CHCl_3$ 1 Hour | % Reduction | ppm $CHCl_3$ 6 Hours | % Reduction | ppm CHCl4 24 Hours | % Reduction |
|---|---|---|---|---|---|---|---|---|---|
| Control | 0    | 2.0 | 0.0   | 2.0 | 0.0  | 2.1 | -5.0  | 2.3 | -15.0 |
| Exp 12  | 10   | 2.3 | -15.0 | 2.1 | -5.0 | 2.2 | -10.0 | 1.8 | 10.0  |
| Exp 13  | 100  | 1.8 | 10.0  | 1.8 | 10.0 | 1.9 | 5.0   | 1.6 | 20.0  |
| Exp 14  | 1000 | 2.5 | -25.0 | 1.6 | 20.0 | 1.7 | 15.0  | 2.0 | 0.0   |

TABLE 3A

Treatment of 10 ppm CHCl3 with Na2S2O8 (UV Light)

| Treatment | ppm Na2S2O8 | ppm $CHCl_3$ 4 Hour | % Reduction in $CHCl_3$ | ppm $CHCl_3$ 24 Hours | % Reduction in $CHCl_3$ |
|---|---|---|---|---|---|
| Control | 0    | 10.0 | 0.0  | 10.0 | 0.0  |
| Exp 15  | 10   | 8.8  | 12.0 | 7.0  | 30.0 |
| Exp 16  | 100  | 8.8  | 11.7 | 8.3  | 17.4 |
| Exp 17  | 1000 | 8.8  | 14.3 | 6.2  | 38.0 |

TABLE 3B

Treatment of 10 ppm CHCl3 with KHSO5 (UV Light)

| Treatment | ppm KHSO5 | ppm $CHCl_3$ 4 Hour | % Reduction in $CHCl_3$ | ppm $CHCl_3$ 24 Hours | % Reduction in $CHCl_3$ |
|---|---|---|---|---|---|
| Control | 0    | 10.0 | 0.0  | 10.0 | 0.0  |
| Exp 18  | 10   | 9.1  | 8.7  | 7.7  | 23.5 |
| Exp 19  | 100  | 8.7  | 12.7 | 8.3  | 16.8 |
| Exp 20  | 1000 | 8.5  | 15.1 | 6.0  | 40.4 |

We claim:

1. A method for destroying a haloform, the method comprising dosing an aqueous system containing at least 2 ppm of a haloform selected from the group consisting of chloroform, bromoform, and combinations thereof with at least 5 ppm of a persulfate selected from the group consisting of caroates, dipersulfates, and combinations thereof.

2. The method of claim 1 wherein the aqueous system is dosed with from 10 ppm to 10,000 ppm of the persulfate.

3. The method of claim 1 wherein the aqueous system is dosed with from 500 ppm to 2000 ppm of the persulfate.

4. The method of claims 1, 2 or 3 wherein the concentration of haloform is at least 10 ppm.

5. The method of claim 4 in which the haloform is chloroform.

6. The method of claims 1, 2 or 3 wherein the concentration of persulfate is at least 22 ppm.

7. The method of claim 6 in which the haloform is chloroform.

8. The method of claim 6 in which the persulfate is a dipersulfate.

9. The method of claim 1 further comprising exposing the aqueous system to ultraviolet light.

10. The method of claim 9 in which the aqueous system is exposed to ultraviolet light during the first hour immediately following persulfate dosing.

11. The method of claim 1 in which the haloform is chloroform.

12. A method for destroying a haloform, the method comprising dosing an aqueous system containing at least 2 ppm of a haloform selected from the group consisting of chloroform, bromoform, and combinations thereof with at least 5 ppm of a reagent consisting essentially of a persulfate selected from the group consisting of caroates, dipersulfates, and combinations thereof.

13. The method of claim 12 wherein the aqueous system is dosed with from 10 ppm to 10,000 ppm of the persulfate.

* * * * *